United States Patent
Grogler et al.

[15] 3,691,112
[45] Sept. 12, 1972

[54] PROCESS FOR THE PRODUCTION OF POLYAMIDE FOAMS AND ELASTOMERS FROM AMINO-CROTONIC ACID ESTERS

[72] Inventors: Gerhard Grogler, Leverkusen; Gunter Oertel, Cologne, both of Germany

[73] Assignee: Farbenfabriken Bayer Aktiengesellschaft, Leverkusen, Germany

[22] Filed: July 10, 1970

[21] Appl. No.: 53,994

[30] Foreign Application Priority Data

July 12, 1969 Germany.........P 19 35 484.8

[52] U.S. Cl......260/2.5 AM, 260/2.5 A, 260/77.5 R, 260/77.5 AM, 260/77.5 CH
[51] Int. Cl. .....C08g 22/44, C08g 22/00, C08g 20/00
[58] Field of Search ...260/77.5 R, 77.5 TB, DIG. 34, 260/2.5 A, 2.5 AM

[56] References Cited

UNITED STATES PATENTS 2,955,056  10/1960  Knox..........................117/98
3,314,921  4/1967  Berchtold.................260/77.5
3,314,922  4/1967  Berchtold.................260/77.5

OTHER PUBLICATIONS

Iwakura et al., Chemical Abstracts, Vol. 53, No. 2, 1200b

Primary Examiner—Donald E. Czaja
Assistant Examiner—H. S. Cockeram
Attorney—Plumley & Tyner

[57] ABSTRACT

Novel polyamides are obtained by a process which comprises the polyaddition of aliphatic or aromatic polyisocyanates with N-substituted-amino-crotonic acid esters. The addition of the NCO group takes place on the active hydrogen atom of the

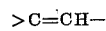

group of the amino-crotonic acid ester.

16 Claims, No Drawings

PROCESS FOR THE PRODUCTION OF POLYAMIDE FOAMS AND ELASTOMERS FROM AMINO-CROTONIC ACID ESTERS

There are numerous processes for producing polyamides by polycondensing aliphatic or aromatic dicarboxylic or polycarboxylic acids with polyamines and by condensing amino-carboxylic acids. Polyamides can also be obtained by polymerizing lactams.

A novel process for the production of polyamides has now been found, which enables a wide variation in the properties of the polyamides, and which is based on the polyaddition of aliphatic or aromatic polyisocyanates with polyfunctional amino- or N-substituted-amino-crotonic acid esters. The most important feature of this process is that addition of the NCO group always takes place on the active hydrogen atom of the $$>C=CH-$$

group of the amino-crotonic acid ester, whilst although the N-function present in the amino-crotonic acid ester catalyses addition to any appreciable extent, it surprisingly does not itself take any part in the reaction. The polyamides formed contain reactive double bonds, which can be of importance in addition and polymerization reactions.

Accordingly, it is an object of this invention to provide high molecular weight polyamides, optionally crosslinked, polyamides with a molecular weight of from 500 to 100,000 containing the recurring structural element:

$$A-O-CO-C-CO-NH-B$$
$$\underset{R}{\overset{\text{\Large{C}}}{\underset{\diagdown}{\text{N}}}}\overset{CH_3}{\underset{R'}{\diagup}}$$

in which
  A represents the polyfunctional radical left by removal of the OH groups from a polyol,
  B represents the polyfunctional radical left by removal of the NCO groups from an organic polyisocyanate,
  R and R', which may be the same or different, each represents a hydrogen atom or an alkyl radical, alkenyl radical, cyclo-alkyl radical, aralkyl radical or aryl radical, or
  R and R', together with the nitrogen atom to which they are attached, represent a heterocyclic ring, optionally containing a further hetero atom.

It is another object of this invention to provide a process for the production of optionally crosslinked high molecular weight polyamides which comprises reacting an organic polyisocyanate with a polyfunctional amino-crotonic acid ester of the general formula:

$$[CH_3-C=C-CO-O-]_n-A$$
$$\underset{R}{\overset{\text{\Large{N}}}{\underset{\diagdown}{\text{}}}}\overset{}{\underset{R'}{\diagup}}$$

wherein
  R and R', which may be the same or different, each represents hydrogen or an alkyl, alkenyl, cycloalkyl, aralkyl or aryl radical, optionally substituted by one or more halogen atoms, or ether, thioether or nitrile groups, or
  R and R', together with the nitrogen atom to which they are attached, may form a heterocyclic ring, optionally containing a further hetero atom,
  A represents the radical of the polyol with a functionality of $n$, and
  $n$ represents an integer from 2 to 6.

It is possible in this way to obtain high molecular weight, optionally crosslinked polyamides with molecular weights of from 5,000 to 100,000, which contain a common structural element of the formula:

$$A-O-CO-C-CO-NH-B$$
$$\underset{R}{\overset{\text{\Large{C}}}{\underset{\diagdown}{\text{N}}}}\overset{CH_3}{\underset{R'}{\diagup}}$$

wherein
  A represents the polyfunctional radical of a polyol and
  B represents the polyfunctional radical of an organic polyisocyanate, whilst
  R and R' have the meanings given above.

This structural element can be recognized from its nuclear resonance spectrum. The signal due to the hydrogen atom of a $$>C=CH-$$

group in the polyfunctional amino-crotonic acid ester originally generated at 5.0 ppm (10 percent by weight solution in dimethyl sulphoxide) disappears following the addition of polyisocyanate. Accordingly, when R represents hydrogen, the isocyanate is always attacked on this active hydrogen atom of the $$>C=CH-$$

group. With polyfunctional amino-crotonic acid esters and with polyamides, the infrared spectrum shows a displacement of the carbonyl band of the ester groups towards longer wavelengths, indicating appreciable hydrogen bridge formation.

The polyfunctional acetoacetic acid esters obtained by the reaction of diketene with polyols in accordance with the general equation:

$$A(OH)_n + nCH_2=C-O \longrightarrow [CH_3-C-CH_2-CO-O-]_n-A$$
$$\underset{}{\underset{CH_2-C=O}{|}} \qquad \underset{}{\underset{O}{\|}}$$

may be used as starting materials for the polyfunctional amino-crotonic acid esters.

The following are suitable polyols of the formula $A(OH)_n$: ethylene, propylene and butylene glycol; 1,12-octadecane diol; diethylene, triethylene and tetraethylene glycol; glycerol; trimethylol propane; 1,2,4-butane triol; 1,2,6-hexane triol; xylylene glycol;

β-hydroxyalkyl ethers of polyphenols; and polyalcohol esters of castor oil. Hydroxyl polyethers can also be used. Suitable hydroxyl polyethers include linear or branched polyalkylene ether polyols with molecular weights of from 500 to 5,000 which can be obtained, for example, by polyaddition reactions involving 1,2-alkylene oxides (such as ethylene oxide, propylene oxide, 1,2- and 2,3-butylene oxide, epichlorohydrin, styrene oxide of cyclohexene oxide), either individually or in admixture with one another, by themselves or in the presence of low molecular weight starter molecules (such as water; glycols such as 1,6-hexane diol or 1,3-butylene glycol; polyols such as trimethylol propane, glycerol, pentaerythritol or sorbitol; and mono and/or oligosaccharides glucose, lactose or degraded starches). Other suitable hydroxyl polyethers include polytetrahydrofuran polyethers or polyoxacyclobutane polyethers with molecular weights of from 500 to 5,000. Other suitable polyols include linear or branched polyalkylene ether polyols containing tertiary nitrogen, which can be obtained from 1,2-alkylene oxides (such as those mentioned above), in the same way as the neutral polyalkylene ether polyols by polyaddition with amines or aminoalcohols. Aliphatic monoamines or polyamines containing primary and/or secondary amino groups are preferably used as starting components in the preparation of the basic polyalkylene ether polyols. Examples include ammonia; alkylamines such as methylamine or ethylamine; diamines of the general formula:

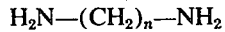

in which $n$ is an integer from 2 to 12, (such as ethylene diamine, tetramethylene diamine or hexamethylene diamine); polyamines of the general formula:

in which $n$ is an integer from 1 to 6 (such as diethylene triamine or triethylene tetramine); and piperazine or N,N'-bis-(β-aminoethyl)-piperazine. The aforementioned polyalkylene ether polyols and amino polyethers (optionally containing tertiary amine nitrogen) may optionally also be used together with other polyhydroxyl compounds containing reactive hydrogen, for example with polythioethers, polyacetals or polycarbonates, optionally still containing urethane groups prepared by conventional processes. Other compounds containing reactive hydrogen atoms suitable for the purposes of the invention include relatively high molecular weight, compounds, for example mixed aliphatic-aromatic polyethers obtained by condensing bis-chloromethyl derivatives of aromatic hydrocarbons with aliphatic polyols; copolymers with terminal hydroxyl groups of olefins, cyclic acetals or polyacetals; polycondensates of polycarboxylic acids and polyhydric alcohols; hydrolyzed copolymers of ethylene and vinyl acetate or hydroxyalkyl methacrylates; polyallyl alcohol; copolymers of styrene and allyl alcohol; and polystyrene or polybutadiene with terminal hydroxyl groups.

Another known method of preparing the polyfunctional acetoacetic acid esters is to transesterify methyl or ethyl acetoacetate with polyols.

The polyfunctional acetoacetic acid esters thus obtained are subsequently converted as known per se by the action of ammonia or aliphatic or aromatic primary or secondary monoamines into the corresponding polyfunctional aminocrotonic acid esters of the general formula given above, accompanied by the elimination of water. Condensation can be carried out in the presence or absence of a catalyst at temperatures of from 0° to 150°C, and pereferably at 60° to 120°C. In many instances, it is of advantage to carry out the reaction in the presence of a solvent which forms an azeotrope with water under the effect of heat, and which is substantially immiscible with water in the absence of heat. Such hydrocarbons as benzene, toluene or halogenated hydrocarbons, such as chloroform or carbon tetrachloride, are primarily used. One of the conventional water separators may be used with advantage to separate the water of reaction. Suitable catalysts include acids, for example hydrochloric acid, formic acid or glacial acetic acid, or other compounds such as iodine, cation exchangers or active alumina. If condensation is carried out under the aforementioned conditions, mobile or oily liquids, viscous, wax-like or solid masses can be obtained in high yields, in dependence upon the type of polyol and amino component employed. The progress of the reaction can readily be followed by determining the amount of water eliminated.

In addition to ammonia, the following primary or secondary monofunctional amines are mentioned by way of example for the reaction with the polyfunctional acetoacetic acid esters: methylamine; ethylamine; diethylamine; propylamine; 3-amino-1-N-dimethylaminopropane; 3-methoxypropylamine; 3-methylamino propionitrile; 3-(2-ethylhexyloxy)-propylamine; allylamine; butylamine; dibutylamine; 2-ethylhexylamine; hexylamine; 1-amino-3-hexene; dodecylamine; stearylamine; oleylamine; cyclohexylamine; N-methyl-cyclohexylamine; dicyclohexylamine; 3-amino-cyclohexene; benzylamine; 4-ethoxybenzylamine; pyrrolidine; N-methyl piperazine; morpholine; aniline; p-chloroaniline; 4-methoxyaminobenzene; p-anisidine; p-toluidine; and α-aminonaphthalene.

The polyfunctional amino-crotonic acid esters obtained by the process described above can be used as starting materials for the process according to the invention.

The polyfunctional amino-crotonic acid ester may be reacted according to the invention with almost any organic polyisocyanate, of which the following are mentioned by way of example:

aliphatic, cycloaliphatic or aralipatic polyisocyanates, such as 1,4-diisocyanatobutane, 1,6-diisocyanatohexane, m- and p-xylylene diisocyanate, dicyclohexylmethane-4,4'-diisocyanate and cylohexane-1,3- and cyclohexane-1,4-diisocyanate; aromatic polyisocyanates such as 1-alkyl-2,4- and -2,6-diisocyanates, for example tolylene-2,4- and tolyl-lene-2,6-diisocyanate, as well as arbitrary isomeric mixtures of these two isocyanates, phenyl-1,3- and phenyl-1,4-diisocyanate, diphenylmethane-4,4'-diisocyanate, naphthylene-1,5-diisocyanate, diphenyl ether-4,4'-diisocyanate and 2,2'-dimethyl diphenylmethane-4,4'-diisocyanate; polymethylene polyphenyl polyisocyanates obtained by aniline-formaldehyde condensation followed by phosgenation; toluene-2,4,6-triisocyanate and 4,4',4''-triphenylmethane triisocyanate. The aforementioned polyisocyanates may be used either individually or in admixture with one another. It is also possible to use dimeric polyisocyanates, for example 3,3'-diisocyanato-4,4'-dimethyldiphenyluretdione. The polyisocyanates prepared in accordance with German Patent Specification No. 1,092,007 and the isocyanurate polyisocyanates obtained by polymerising 2,4- or 2,6-diisocyanato toluene, may also be employed in accordance with the invention. Also suitable are NCO adducts containing two or more NCO groups, of the kind obtained by reacting an excess of the aforementioned polyisocyanates with low molecular weight polyols, such as ethylene glycol, propylene glycol, butylene glycol, trimethylol propane, hexane triol, glycerol, sorbitol or castor oil; with ethylene diamine; or with high molecular weight polyols, for example hydroxyl polyethers or polyesters.

The process according to the invention can be carried out in various different ways. In a preferred embodiment of the process, the polyfunctional amino-crotonic acid ester is used individually with a polyisocyanate, the ratio of NCO to active hydrogen being approximately 1. This operation can be carried out in the presence or absence of solvents. Examples of suitable solvents include ethyl acetate, chlorobenzene, dioxan, methylene chloride, chloroform, acetone, butyl acetate, ethylene glycol monomethyl ether acetate, tetrahydrofuran and also aromatic or aliphatic hydrocarbons, including commercial mixtures.

The end products can be in the form of colorless powders which are precipitated, on account of their insolubility in solvents, or relatively high molecular weight materials which remain clearly dissolved providing the solvents and starting components are suitably selected. Evaporation of the solvent leaves behind a transparent elastic or hard film. Although the nitrogen functions of the polyfunctional amino-crotonic acid esters accelerate the reaction of the NCO groups with the active hydrogen atoms to an appreciable extent, it is nevertheless advisable, especially with high molecular weight linear starting materials, to accelerate the reaction with additional catalysts, for example organic tin compounds of the tin (II) ethyl hexoate type, or with other known activators, such as tertiary amines, for example diazabicyclo-octane or permethylated diethylene triamine. Naturally, it is always advisable to employ catalysts when the reaction is carried out at low temperatures. In many instances, it is also advisable briefly to heat the reaction mixtures in moulds at temperatures of from 80° to 100°C, in order to guarantee a complete reaction over an extremely short period. Hard, plastic, flexible or elastomeric products, which in many instances are no longer soluble in conventional solvents, are obtained in dependence upon the starting components selected.

In another embodiment of the process, the polyfunctional amino-crotonic acid esters are reacted with a polyisocyanate in a ratio of NCO to reactive hydrogen of greater than 1 and preferably greater than 2. This reaction can be carried out in the presence or absence of solvents. The resulting polyamides, which contain isocyanate groups, can then be hardened with the crosslinking agents commonly used in isocyanate chemistry, for example water, polyols which may also contain hetero atoms such as tertiary nitrogen atoms, amino-alcohols, polyamines or dicarboxylic acid hydrazides. When water is used, the moisture present in the air is in itself sufficient, converting a thin layer of the end products into an insoluble film over a period of a few hours. The end products are, therefore, suitable for use as single-component lacquers which harden on contact with atmospheric moisture. The end products harden at temperatures as low as room temperature, although faster setting times are, of course, obtained at higher temperatures. For example, tertiary amines or metal compounds soluble in organic solvents may be used as catalysts for moisture hardening. The end products are especially suitable for the production of coverings on substrates, for examples lacquers, adhesives, laminations or coatings.

In another embodiment of the process, the polyfunctional amino-crotonic acid esters can be reacted in admixture with other compounds containing active hydrogen atoms, in which case polyamide formation is accompanied by the formation of urethane or urea groups. Compounds of this kind containing reactive hydrogen include, for example, polyethers of the kind obtained under alkaline or acid conditions by the addition polymerization of one or more alkylene oxides with one or more polyols or amines, by known processes, for example those described in "High Polymers," Vol. XIII, "Polyethers" Part 1 (1963), Interscience Publishers. The molecular weight of the polyether can differ, depending upon the purpose for which it is intended to use the end products. It is generally in the range from 300 to 3,000 and preferably in the range from 400 to 2,000.

Polyesters are also suitable, for example the reaction products obtained by known processes of one or more polyols, such as ethylene glycol, diethylene glycol, butylene glycol, glycerol or hexane triol, with one or more polycarboxylic acids, such as oxalic acid, succinic acid, adipic acid, pimelic acid, maleic acid, phthalic acid or terephthalic acid. The molecular weight of the polyesters can differ, depending upon the purpose for which the end product is to be used, and is generally in the range from 300 to 3,000 and preferably in the range from 400 to 2,000.

The polyfunctional amino-crotonic acid esters, which are more reactive than the polyalkylene glycols, may also be used with advantage in the production of foams; the polyfunctional amino-crotonic acid esters being reacted either individually or optionally in conjunction with other compounds containing active hydrogen atoms, with a corresponding quantity of a polyisocyanate in the presence of water or other expanding agent, and optionally reaction accelerators, emulsifiers, stabilizers, pore regulators or other additives. When water is used, the isocyanate-water reaction yielding carbon dioxide as the expanding gas is catalysed only to a limited extent by the polyfunctional amino-crotonic acid esters, while the molecule-linking polyamide-forming reaction takes place to a much greater extent. The two reactions can readily be synchronized by adding small quantities of tertiary amines such as diazabicyclo-octane or permethylated polyamines.

The polyamide foams and polyamide-polyurethane-polyurea foams obtained by this embodiment of the process can have soft elastic or semi-hard properties, depending upon the type of starting components used.

Polyamide foams can also be obtained by a two-stage process, in which the polyfunctional amino-crotonic acid esters are initially converted, by reaction with an excess of polyisocyanate, into isocyanate-containing preadducts from which polyamide foams are subsequently formed in a separate operation with water, catalysts and additives. In the so-called mold-foaming technique, this embodiment often affords advantages in processing. When polyfunctional amino-crotonic acid esters based on polyols containing tertiary nitrogen are used, there is occasionally no need to add additional tertiary amine as catalyst in the foaming of the isocyanate-containing preadducts produced from them. The polyamide foams produced by this embodiment of the process are elastic and are distinguished by their outstanding tensile strength.

In addition, plastics which may be used as mouldings, casting compositions or elastomeric products, optionally in solutions as paints or coating compositions, may be obtained by reacting the polyfunctional amino-crotonic acid esters with polyisocyanates, optionally in the presence of additional crosslinking agents.

PREPARATION OF THE STARTING PRODUCTS

The polyols used to prepare the polyfunctional amino-crotonic acid esters are identified in column 1 of the following table. The viscosity of the polyfunctional acetoacetic acid esters obtained by reaction with diketene, the amines used and the physical properties of the polyfunctional amino-crotonic acid esters are set out in columns 2, 3 and 4, respectively.

POLYOLS 1. ethylene glycol
2. tripropylene glycol
3. linear polyethers, starting component = 1,2-propane diol, OH number 112, molecular weight 1,000
4. partly branched polyethers, OH number 56, molecular weight 2,500
5. branched polyethers, OH number 56, molecular weight 3,000
6. linear polyethers, OH number 56, molecular weight 2,000
7. branched polyethers, OH number 35, molecular weight 4,800
8. linear polyethers, starting component = methylamine, OH number 56, molecular weight 2,000
9. castor oil, OH number 158.

TABLE

| Ester | Polyol | Polyfunctional acetoacetic acid esters (cp.$_{25}$) | Amine | Polyfunctional amino-crotonic acid ester viscosity (cp.$_{25}$) M.P. |
|---|---|---|---|---|
| A | 1 | 22 | Ammonia | M.P.=152–154° C. |
| B | 1 | 22 | Cyclohexylamine | M.P.=98–100° C. |
| C | 1 | 22 | Dibutylamine | Oily. |
| D | 2 | 36 | n-Propylamine | 260. |
| E | 3 | 160 | Cyclohexylamine | 970. |
| F | 3 | 160 | Aniline | Oily. |
| G | 4 | 450 | Cyclohexylamine | 910. |
| H | 5 | 540 | do | 900. |
| I | 5 | 540 | 2-ethyl-hexylamine | 800. |
| J | 5 | 540 | n-Butylamine | 575. |
| K | 6 | 360 | Cyclohexylamine | 710. |
| L | 6 | 360 | Ammonia | 970. |
| M | 7 | 870 | Cyclohexylamine | 1,500. |
| N | 8 | 340 | n-Butylamine | 500. |
| O | 9 | 330 | Cyclohexylamine | 4,500. |

The preparation of one of the polyfunctional amino-crotonic acid esters is described below by way of example.

Following the addition of 0.5 g of permethylated diethylene triamine or 1 g of triethylamine, 176 g (2.1 mols) of diketene are slowly added dropwise at 50° to 60°C to 1,000 g (1.0 mol) of a linear polyether (3) with an OH number of 112. On completion of the dropwise addition, the mixture is stirred until it has cooled and the excess diketene is distilled off in vacuo at room temperature. The reaction mixture is dissolved in 400 to 500 ml of benzene, followed by the addition in portions of 198 g (2.0 mols) of cyclohexylamine. The mixture is then heated to boiling point with a water separator attached to the reaction vessel. After some 3 to 4 hours, 35 to 36 g of water have been separated (theoretical quantity 36 g). The benzene is then distilled off in vacuo, after which the polyfunctional amino-crotonic acid ester is obtained in the form of a pale yellow liquid with a viscosity of 970 cP$_{25}$. The yield is quantitative.

The following examples are to further illustrated the invention without limiting it. EXAMPLE 1

Twenty g of bifunctional aminocrotonic acid ester A are dissolved under heat in 100 ml of tetrahydrofuran. A solution of 22 g of diphenylmethane-4,4'-diisocyanate in 10 ml of tetrahydrofuran is then added and the reaction mixture is kept for 1 hour at 50°C. Evaporation of the tetrahydrofuran leaves behind the polyamide in the form of a solid foamy substance with a softening point of 160° to 180°C and a molecular weight of 1,500.

EXAMPLE 2 a. If 20 g of the bifunctional aminocrotonic acid ester B are dissolved in 80 to 100 ml of benzene and 12.8 g of diphenylmethane-4,4'-diisocyanate and approximately 10 ml of benzene are added, a white powder, which is still soluble in tetrahydrofuran and methylene chloride, is soon precipitated. Determination of the molecular weight by the osmotic method gives a value of 1,660.

b. If, by contrast, a mixture of 20 g of the bifunctional aminocrotonic acid ester B and 12.8 g of diphenylmethane-4,4'-diisocyanate is homogenzied under heat, the mass soon solidifies in an exothermic reaction to form a product that is no longer soluble in organic solvents. After heating for 15 minutes at 80°C, a polyamide is obtained in the form of a yellow brittle thermoplastic resin.

EXAMPLE 3 a. 100 g of bifunctional aminocrotonic acid ester D and 61 g of a polyisocyanate (NCO = 31 percent) obtained in accordance with German Patent Specification No. 1,092,007 are quickly mixed together. After some 3 minutes, there is a violent exothermic reaction, and the mixture solidifies after some 5 minutes to form a pale yellow glass-like polyamide which breaks under heavy flexural stress.

b. If the polyaddition reaction is carried out with 56.5 g of diphenylmethane-4,4'-diisocyanate and the reaction mixture is subsequently heated for 30 minutes at 80°C, a bubble-free glass-hard resin is also obtained.

EXAMPLE 4

One hundred g of the bifunctional aminocrotonic acid ester E and 20.3 g of naphthylene-1,5-diisocyanate are quickly mixed together at a temperature of approximately 100°C. The mixture is left to cool to room temperature, after which an elastomeric material of outstanding tensile strength is obtained. Its insolubility in organic solvents is indicative of a high-grade polyaddition.

EXAMPLE 5

A similar elastomeric but softer polyamide than that described in Example 4 is obtained by stirring 10 g of diphenylmethane-4,4'-diisocyanate starting material (NCO = 29 percent) into 100 g of the polyfunctional aminocrotonic acid ester M. At room temperature, the setting time is about 1 hour.

EXAMPLE 6

One hundred of the polyfunctional aminocrotonic acid ester J, 0.3 g of tin-(II)-ethylhexoate and 7.8 g of an isomer mixture of 80 percent by weight of 2,4- and 20 percent by weight of 2,6-diisocyanato-toluene are heated for 2 hours at 100°C. After the reaction mixture has cooled, a tacky but elastic material is obtained.

EXAMPLE 7

The mixture of 200 g of the polyfunctional aminocrotonic acid ester O with 70 g of diphenylmethane-4,4'-diisocyanate leads, after only 15 minutes, through a highly exothermic reaction to a semi-hard polyamide of high elasticity.

EXAMPLE 8

A mixture of 50 g of the bifunctional aminocrotonic acid ester D, 30 g of ethylene glycol monomethyl ether acetate and 20 g of toluene are stirred with 20 g of an isomeric mixture of 65 percent by weight of 2,4- and 35 percent by weight of 2,6-diisocyanato-toluene. After the solution has been thinly applied to a substrate, a film is obtained after 30 minutes. Following gradual evaporation of the solvent, a hard scratch-proof lacquer coating, which breaks under heavy flexural stress, is obtained.

EXAMPLE 9

Eighteen g of naphthylene-1,5-diisocyanate are added quickly at 100°C. to a mixture of 100 g of the bifunctional aminocrotonic acid ester L and 4 g of 1,4-butane diol, and the reaction mixture is subsequently poured into a mould. After heating for 15 minutes at 80° to 100°C, a bubble-free thermoplastic product is obtained.

EXAMPLE 10

Sixty-seven g of 2,4-diisocyanato-toluene (ratio NCO:active hydrogen = 2:1) are added while stirring at room temperature to 500 g of the polyfunctional aminocrotonic acid ester G, producing a rise in temperature to 45°C. over the next 15 minutes. After stirring for 2 hours, the reaction is complete. The reaction mixture now has an NCO content of 2.5 percent. Another measurement after approximately 1 month did not reveal any appreciable decrease in the NCO content.

a. If the addition product formed with the NCO content quoted is thinly applied to a glass plate, a transparent elastic film, which is no longer soluble in organic solvents, is obtained after storage for 15 hours at a relative humidity of from 50 to 60 percent.

b. Three hundred g of the NCO-containing polyamide described above are stirred with 7.8 g of 1,4-butane diol. After approximately 10 hours, a soft but completely crosslinked product is obtained.

EXAMPLE 11

Following the procedure of Example 10, 300 g of the bifunctional aminocrotonic acid ester N are reacted with 47 g of an isomer mixture of 80 percent by weight of 2,4- and 20 percent by weight of 2,6-diisocyanato-toluene, and approximately 50 g of the product are applied thinly to a substrate. The tertiary nitrogen present in starting polyol (8) catalyses the NCO/$H_2O$ (atmospheric moisture) reaction to an even greater extent than the nitrogen function in the aminocrotonic acid ester, so that an elastic film is formed after only 5 hours.

EXAMPLE 12

The following reaction components (A and B) are mixed by means of a high speed stirring mechanism:

A = 100 g of the polyfunctional aminocrotonic acid ester M,
0.4 g of permethylated diethylene triamine,
0.1 g of tin (II) 2-ethylhexoate,
0.5 g of an organosiloxane-ethylene oxide-block polymer,
3.0 g of water.
B = 35.0 g of an isomer mixture of 65% by weight of 2,4- and 35% by weight of 2,6-diisocyanato-toluene.

The mixture of A and B begins to foam immediately, and after some 70 seconds forms a fine-pored elastic polyamide foam which distinguished from a polyurethane foam by its lower compression hardness. It has a unit weight of around 40 Kg/$m^3$.

EXAMPLE 13

The following components A and B are combined:

A = 100 g of the polyfunctional aminocrotonic acid ester I,
0.3 g of 1,4-diaza-(2,2,2)-bicyclooctane,
0.1 g of tin (II) 2-ethylhexoate,
0.6 g of an organosiloxane-alkylene oxide block polymer,
3.0 g of water.
B = 37.0 g of an isomer mixture of 80% by weight of 2,4- and 20% by weight of 2,6-diisocyanato-toluene.

After an expansion time of approximately 80 seconds, a polyamide foam with a unit weight of around 38 Kg/$m^3$ is obtained.

EXAMPLE 14

One hundred g of the polyfunctional aminocrotonic acid ester G are reacted by the hand-foaming method with:

0.4 g of permethylated diethylene triamine,
0.4 g of tin (II) 2-ethylhexoate,
0.4 g of an organosiloxane-alkylene oxide block polymer,
3.0 g of an isomer mixture of 80% by weight of 2,4- and 20% by weight of 2,6-diisocyanato-toluene, to form an elastic foam after an expansion period of about 80 seconds. This end product is characterized by its limited compression hardness but outstanding tensile strength.

EXAMPLE 15

One hundred g of an NCO preadduct with an NCO content of 9.2 percent obtained from 100 g of the polyfunctional aminocrotonic acid ester G and 35 g of an isomer mixture of 80 percent by weight of 2,4- and 20 percent by weight of 2,6-diisocyanato-toluene, are stirred thoroughly with 0.3 g of an organosiloxane-alkylene oxide block polymer. A mixture of 2 g of water, 0.5 g of diethylamine oleic acid and 4 g of N-ethyl morpholine is then added. An elastic foam with lightly closed cells is formed after an expansion time of approximately 110 seconds.

What we claim is:

1. A polyamide with a molecular weight of from 500 to 100,000 containing the recurring structural element of the general formula

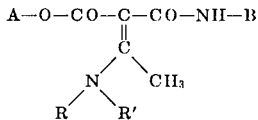

either R or R' represents a hydrogen atom or

R and R', which may be the same or different, each represents a radical selected from the group consisting of an alkyl, an alkenyl, a cycloalkyl, an aralkyl and an aryl radical, A represents the polyfunctional radical left by removal of the OH groups from a polyol, and B represents the polyfunctional radical left by removal of the NCO groups from an organic polyisocyanate.

2. The polyamide as claimed in claim 1, wherein said radicals R and R' are substituted by one or more substituents selected from the group consisting of halogen, an ether, a thioether and a nitrile group.

3. The polyamide as claimed in claim 1, wherein said radicals R and R', together with the nitrogen atom to which they are attached, represent a heterocyclic ring.

4. The polyamide as claimed in claim 3, wherein said heterocyclic ring contains a further hetero atom.

5. A process for the production of polyamides with a molecular weight of from 500 to 100,000 which comprises reacting an organic polyisocyanate with a polyfunctional aminocrotonic acid ester of the general formula

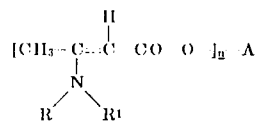

wherein
either R or R' represents a hydrogen atom or

R and R', which may be the same or different, each represents a radical selected from the group consisting of an alkyl, an alkenyl, a cycloalkyl, an aralkyl and an aryl radical, or R and R', together with the nitrogen atom to which they are attached, represent a heterocyclic ring, A represents the radical left by removal of the OH groups from a polyol with a functionality of $n$, and $n$ represents an integer from 2 to 6.

6. The process as claimed in claim 5, wherein said radicals are substituted by substituents selected from the group consisting of halogen, an ether, a thioether and a nitrile group.

7. The process as claimed in claim 5, wherein R and R', together with the nitrogen atom to which they are attached, represent a heterocyclic ring containing a further hetero atom.

8. The process as claimed in claim 1, wherein said amino-crotonic acid ester and said polyisocyanate are reacted together directly, the ratio of NCO groups to active hydrogen atoms being approximately 1.

9. The process as claimed in claim 5, wherein said reaction is carried out in the presence of a solvent.

10. The process as claimed in claim 5, wherein said reaction is carried out in the presence of a catalyst.

11. The process as claimed in claim 5, wherein said reaction is carried out at a temperature of from 80° to 100°C.

12. The process as claimed in claim 5, wherein said amino-crotonic acid ester and said polyisocyanate are reacted together, the ratio of NCO groups to active hydrogen atoms being greater than 1, and the resulting product, which contains NCO groups, is hardened with a compound selected from the group consisting of water, a polyol, a polyol containing a hetero atom, a polyol containing hetero atoms, an aminoalcohol, a polyamine, and a dicarboxylic acid dihydrazide.

13. The process as claimed in claim 5, wherein a foam is produced by reacting said aminocrotonic acid ester and said polyisocyanate in the presence of water or another expanding agent.

14. The process as claimed in claim 13, wherein said reaction is carried out in the presence of a compound containing active hydrogen atoms.

15. The process as claimed in claim 13, wherein said reaction is carried out in the presence of water and a tertiary amine.

16. A foamed article comprising the polyamide of claim 1.

* * * * *

UNITED STATES PATENT OFFICE
CERTIFICATE OF CORRECTION

Patent No. __3,691,112__   Dated __September 12, 1972__

Inventor(s) __Gerhard Grogler and Gunter Oertel__

It is certified that error appears in the above-identified patent and that said Letters Patent are hereby corrected as shown below:

| COLUMN | LINE | ERROR |
|---|---|---|
| 3 | 16 | after the word "oligosaccharides" insert --such as cane sugar,---. |
| 7 | In the Table | after the word "esters" insert --viscosity--. |
| 7 | In the Table | after the word "(cp$_{25}$)" insert the word --or--. |
| 9 | Exhibit 6 first line | after the word "hundred" insert the letter --g--. |
| 11 | 4 | "0.4g" should read --0.8--. |
| 11 | Claim 1 | after the formula, insert the word ---wherein--. |

Signed and sealed this 3rd day of December 1974.

(SEAL)
Attest:

McCOY M. GIBSON JR.                    C. MARSHALL DANN
Attesting Officer                      Commissioner of Patents